July 3, 1962

N. O. BRODERSON 3,041,670

METHOD AND APPARATUS FOR FORMING ARTICLES OF
PLASTIC HAVING INTEGRAL SHEEN

Filed April 13, 1960

INVENTOR
NEIL O. BRODERSON

BY Harold T. Stowell
Harold L. Stowell
ATTORNEYS

July 3, 1962 N. O. BRODERSON 3,041,670
METHOD AND APPARATUS FOR FORMING ARTICLES OF
PLASTIC HAVING INTEGRAL SHEEN
Filed April 13, 1960 2 Sheets-Sheet 2

INVENTOR
NEIL O. BRODERSON

BY Harold T. Stowell
Harold L. Stowell
ATTORNEYS

United States Patent Office 3,041,670
Patented July 3, 1962

3,041,670
METHOD AND APPARATUS FOR FORMING ARTICLES OF PLASTIC HAVING INTEGRAL SHEEN
Neil O. Broderson, Rochester, N.Y., assignor to Capital Plastics, Inc., Rochester, N.Y., a corporation of New York
Filed Apr. 13, 1960, Ser. No. 23,597
7 Claims. (Cl. 18—26)

This invention relates to methods and apparatus for forming articles, such as sheets, of polymerizable plastic compositions having light-reflective lamellae incorporated therein, to provide the articles with integral sheen.

Integral sheen, as used herein, is generally independent of the surface treatment or configuration of the article and is due to a more or less ordered or systematic orientation within the material itself of lamellae having light-reflecting properties. Thus the term integral sheen includes the effects commonly referred to in the plastics industry by the terms pearly, nacreous, silky, pearlescent, metallic, and chatoyant.

Many substances have been widely used in the plastics industry for imparting integral sheen to various transparent, or translucent, plastic materials. Such substances include pearl essence obtained from fish scales and other organic and inorganic substances of similar character, lamellae salts, such as basic lead carbonate, acid lead phosphates and arsenates, and metallic powders such as aluminum and bronze powders.

All of these substances have the common property of reflecting light with or without imparting coloration to the plastic material within which the lamellae are incorporated.

It is well recognized that in order to obtain integral sheen, the light-reflecting lamellae must be positioned or oriented so that a large percentage thereof lie with their light-reflecting surfaces parallel to each other and substantially parallel to the surface of the plastic material which is to have the integral sheen appearance.

Many methods have been proposed for orienting particles providing light-reflecting surfaces to form attractive pearlescent patterns in plastic materials. However, none of the prior methods have proven to be entirely satisfactory as such prior processes have generally included tedious and expensive operations which have substantially limited the uses thereof or the processes have provided for only a very limited control of uniformity and/or diversity of the pearlescent effect in the finished article.

It is, therefore, a primary object of this invention to provide a reproducible and relatively inexpensive process for manufacturing articles of polymerizable plastic material having integral sheen, and apparatus for carrying out said process.

A further object is to provide new and improved methods and apparatus for forming plastic sheet material having integral sheen which is well suited for mass production of articles such as buttons.

These and other objects and advantages are provided by the present invention which generally comprises a method of forming articles of polymerizable plastic composition which comprises forming a suspension of light-reflecting lamellae in a polymerizable plastic composition in sticky liquid form, introducing said suspension into a container to provide a mass thereof having at least one planar extended surface and subjecting the mass to oscillatory motion in planes substantially parallel to the plane of said surface while causing at least partial induration of said plastic composition so as to impart motion to the mass and orient the lamellae in substantially parallel relation to said surface.

The invention will be more particularly described hereinafter in reference to the accompanying drawings in which:

FIG. 5 is a top plan view thereof with the mold portion removed.

Figure 1:
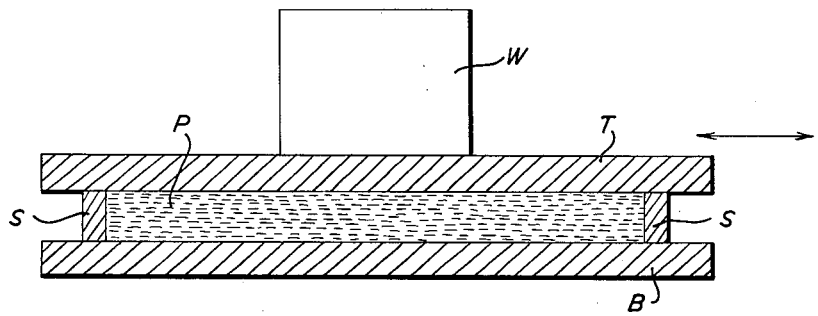
FIG. 1 is a diagrammatic view showing one form of apparatus suitable for carrying out the process of the invention.

The process of the present invention may be carried out by the apparatus shown in FIG. 1, wherein a container is formed by a bottom plate B on which are mounted low peripheral walls S. The container is filled to the top with a sticky liquid, plastic mass P containing light-reflecting lamellae. A top plate T is placed on the filled container so that the under side of the top plate rests on the top surface of the side walls S and contacts the entire upper surface of the sticky liquid plastic mass P within the container. A weight W may be placed on the top plate so as to insure firm engagement between the side walls and the under side of the top plate.

As the top plate T is reciprocated across the top of side walls by any suitable means, it subjects the plastic mass P in the container to an oscillatory motion because the lower surface of the top plate is in adhesive contact with substantially the entire upper surface of the sticky plastic mass P. As the upper surface of the plastic mass is oscillated by movement of the top plate T, the motion is transmitted down into the entire mass of viscous plastic. This reciprocating motion of the top plate T and resultant oscillating motion of the plastic mass is continued while the plastic mass is subjected to polymerization conditions. The oscillation of plate T must begin before gelation of the plastic mass P commences. As polymerization progresses, the viscosity of the plastic mass P increases, so that there is developed within the plastic mass progressively increased resistance to movement thereof. During this period of movement and partial polymerization, the lamellae are oriented and finally held in their oriented position by the polymerized mass. Gelation time and duration of movement may be varied through relatively wide latitudes and hence the process is well adapted for commercial use.

The movement of top plate T may be discontinued after the polymerization has reached a predetermined stage so that rupture and distortion of the plastic sheet may be avoided. If the top plate T is formed of a transparent material such as glass, for example, a noticeable increase in brightness of the plastic mass will be observed, due to increased reflection of light from the oriented lamellae. When this increase in brightness reaches the desired level, movement of the top plate may be discontinued. Stoppage of the movement of top plate at the proper stage of polymerization may also be effected by applying the moving force to the plate T through a torque or force limiting device. By controlling the amount of moving force applied to the plate T, it is possible to stop the movement of the top plate when the plastic mass develops a resistance to a moving force of a predetermined value.

The oscillatory movement for orienting the lamellae in the plastic mass may be applied to the mass in various other manners. For example, the top plate T may be held stationary in adhesive engagement with the plastic mass and the container, comprising the bottom plate B and side walls S may be moved in a plane parallel to the top plate. Further, both the top plate T and the lower plate B may be oscillated in their planes with the plastic mass sandwiched therebetween. Or, the entire container with top and bottom plates and side walls and the plastic mass confined therein may be oscillated as a unit in a plane which is substantially parallel to the top and bottom plates. The oscillation need not necessarily take place along a straight path but may, for example, be in a circular or elliptical path or any combination of straight, circular and elliptical paths. Since this process is especially adapted for making sheet material having integral sheen, it is essential that the oscillatory movement take place in a plane or planes substantially parallel to an extended planar surface of the mass.

While the amplitude and frequency of the oscillatory movement are not critical, it has been found that good results may be obtained for an amplitude of from ⅛ inch to 1 inch and a frequency of 6 to 200 cycles per minute. Good results have also been obtained by employing higher frequencies of about 3,000–6,000 cycles per minute and an amplitude of about 0.01–0.2 inch. In general, the higher frequencies are used with the lower amplitudes.

The process embodying the invention has been used successfully to produce plastic sheet material, ranging in thickness from about 0.050 inch to about 1.0 inch, and having the lamellae or light-reflecting particles oriented therein to provide integral sheen. The orientation of the lamellae is not merely a surface effect but such condition extends throughout the entire thickness of the sheet. Hence, buttons and other articles having integral sheen may be made from such sheets by cutting out blanks and subjecting them to machining and polishing operations.

In one illustrative example of the invention, a mold or container is provided with the bottom plate B formed by a piece of plate glass and with the side walls S formed by cementing to the upper surface of the plate B cardboard strips about ⅛" thick. The upper surfaces of the cardboard sidewalls are waxed so that the top plate T, also made of plate glass, will slide freely along said surfaces. The top and bottom plates are about 12" square and ⅜ inch thick. The dimensions of the mold or container are about 8" x 6" x ⅛".

Two hundred grams of a viscous, sticky, polyester resin, such as Rohm & Haas P–47 or American Cyanamid Laminac 4123, are placed in a container and four grams of synthetic pearl essence (37% by weight of solids and 63% amylacetate and diallylphthalate) are added followed by 0.20 cc. of cobalt naphthenate (6% cobalt as metal) and 4 cc. of methyl ethyl ketone peroxide (60% peroxide in dimethyl phthalate). The resin and additives are then thoroughly blended by agitating the mass.

The mold is filled by carefully pouring the blended mixture therein so that when the top plate T is placed on top of the side walls S the under surface of the plate T is in adhesive engagement with substantially the entire upper surface of the plastic mass in the mold. A substantial weight may be placed on the upper surface of the top plate. The top plate is then reciprocated by hand across the top of the sidewalls at the rate of about 25 strokes per minute and with the plate moving about ⅜ inch per stroke. The repetitive motion of the top plate T may take place in other than a straight line path, such as, for example, in circular or elliptical paths. Since the top and bottom plates are in adhesive engagement with the plastic mass, the reciprocation of the top plate T will subject the plastic mass to an oscillatory movement in planes parallel to the plate T. This movement causes the individual platelets or lamellae of the synthetic pearl essence to become oriented so that their broad faces are substantially parallel to the plane of plate T. During the oscillatory movement of the plastic mass, polymerization of the mass progresses so that the oriented lamellae are thereby held in fixed position. It is essential, therefore, that the oscillatory movement of the plastic mass be started before gelation of the mass begins.

During the reciprocation, there may be observed through the top plate a noticeable increase in brightness which is due to the light reflected from the oriented lamellae. As gelation progresses, it is evidenced by a frictional drag or resistance which develops within the mass. When the mass has gelled sufficiently as evidenced by the force necessary to move the top plate, reciprocation is stopped, the plates are clamped together and the entire assembly is put into an oven at 135° F. The temperature is gradually raised to 220° F. over a period of 2–3 hours to effect a complete cure of the plastic sheet after which the glass plates are stripped off and the sheet is cooled. This sheet has integral sheen extending throughout its entire thickness so that blanks may be cut or disced from it and machined and polished to make buttons, knife handles, decorative inserts, etc., for example.

Figure 2:
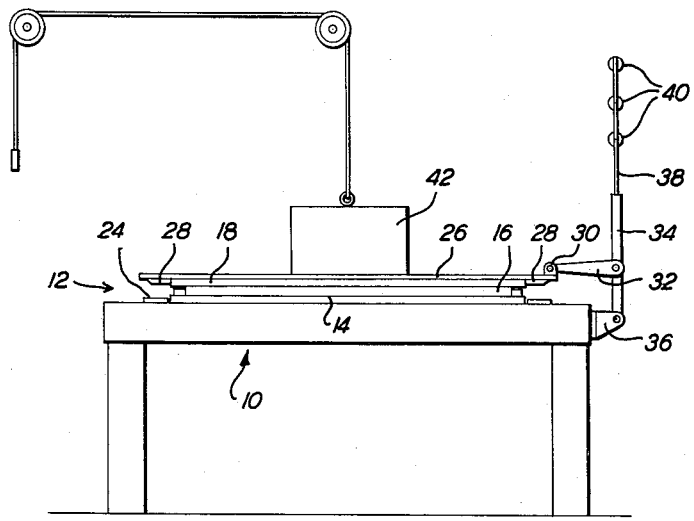
FIG. 2 is a diagrammatic, elevational view of another form of the apparatus of the present invention for producing plastic articles having integral sheen.
Figure 3:
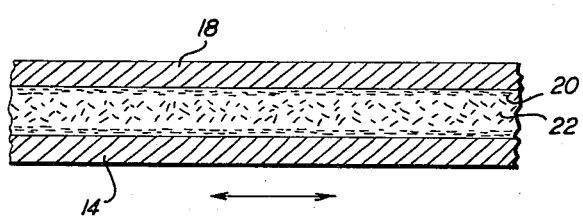
FIG. 3 is a fragmentary elevational view of the mold portions of the device shown in FIG. 2.
Figure 3:
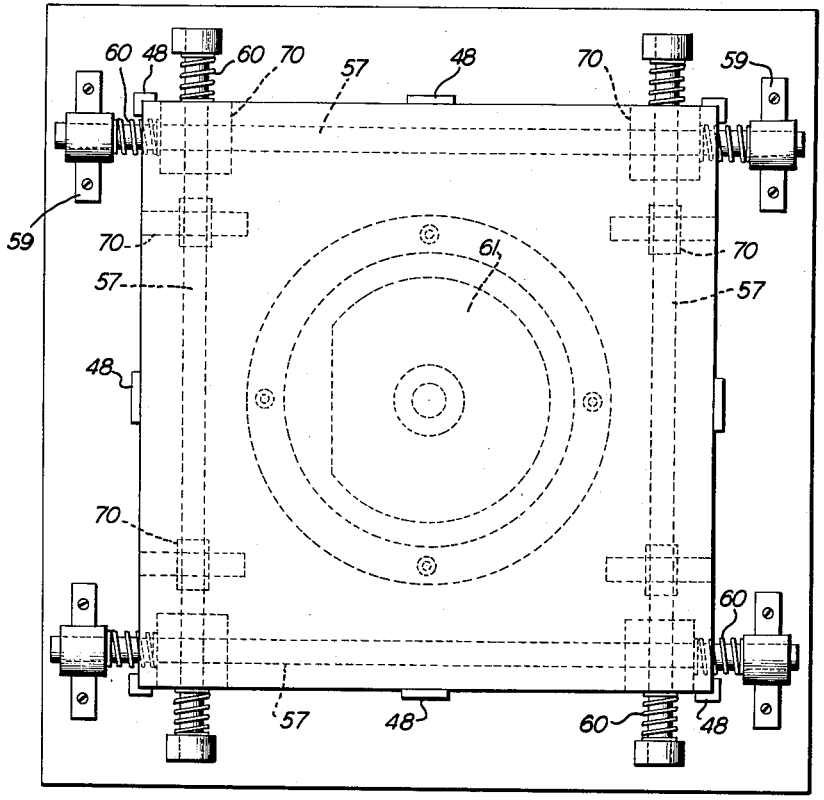

With reference to FIGS. 2 and 3 of another illustrated embodiment of the present invention, 10 generally designates a support for mold 12. The mold 12 comprises a lower portion 14 having upstanding side portions 16 and a top portion 18. The mold portions 14, 16 and 18 cooperate to provide a cavity adapted to receive a relatively sticky liquid polymerizable plastic composition 20 having incorporated therein lamellae 22 of the light-reflecting type. The base of the lower mold portion 14 is secured to the top of the support 10 by frame members 24 which prevent relative movement between the support and mold portion 14. The upper mold portion 18 is secured to a frame or cover 26 by clamps or cleats 28.

One of the ends of the frame 26 is provided with an upstanding boss 30 having pivotally secured thereto an arm 32, which arm is pivotally mounted to lever arm 34. One end of the lever arm 34 is pivotally mounted to bracket 36 rigidly secured to the support 10 while the other end of the lever arm 34 is provided with an upstanding member 38 which may be constructed, for example, of spring steel. The spring member 38 has secured thereto a plurality of hand gripping elements 40 in spaced relation to the point of pivotal connection between the arm 32 and the lever 34. A removable weight 42 may be provided for urging the two mold portions 14 and 18 into contact with side portions 16 as shown in FIG. 2 and into contact with the sticky mass of plastic maintained therebetween.

In operation of this form of the invention a relatively sticky polymerizable liquid plastic material, as to be more fully described hereinafter, provided with suitable catalyst and accelerators or hardening catalyst and containing light-reflecting lamellae, is poured while in the liquid state within the cavity formed between the cooperating mold portions. The weight 42 is then applied to the frame 26 to hold the mold portions in the closed position. One of the hand gripping members 40 is then gripped and said hand gripping element is pushed and pulled in a direction to cause relative reciprocating movement between mold portions 14 and 18 through lever 34 and arm 32. As the mold portion 18 reciprocates relative to the mold portion 14 secured to support 10, movement of the plastic material sandwiched therebetween is brought about orienting the lamellae contained therein. Since the mold portion or plate 18 is in contact with the sticky plastic material 20 and adheres thereto, the reciprocation of plate 18 will drag the upper surface of the material 20 back and forth and thereby subject the soft plastic mass 20 to an oscillatory motion in planes substantially parallel to the plate 18 so that the lamellae 22 are thereby oriented with their surfaces substantially parallel to plate 18. As the plastic material polymerizes, the increased viscosity thereof causes greater resistance to relative movement between the mold portions which are in adhesive contact with the plastic. When the material reaches a gel stage and substantially all of the crystals therein have become oriented, the resistance to relative movement of the mold portions will be greater than the tension in spring element 38 whereby, if the operator continues to push and pull on one of the handles 40, the spring 38 will bend without imparting relative movement to the mold portions. By supplying a plurality of hand gripping members 40, torque limiting means are provided so that the operator can discontinue the relative movement of the mold portions when the plastic mass reaches the desired degree of polymerization. For example, if the relative movement between the mold portions is desired to be carried further into the period of gelation, then the lower hand grip 40 would be engaged in operating the device.

After the internal resistance of the plastic material has overcome the spring tension in member 38, the plastic material may be left in the mold cavity until complete polymerization has occurred or it may be removed therefrom and subjected to further indurating conditions, either before or after other mechanical or chemical treatment of the plastic material is brought about. For example, if the plastic material is to be used in the manufacture of buttons, the partially polymerized sheet material within the mold may be cut into a plurality of button blanks, which blanks may then be turned and drilled prior to final hardening.

In practice, it appears that as the resins containing the light-reflecting lamellae gel or polymerize the light-reflecting particles align themselves due to the high frictional forces within the plastic material. It has been found, in general, that the motion of the plastic material in the mold should be continued until the frictional forces tend to ripple the surface of the gelled or polymerized plastic material.

Figure 4:
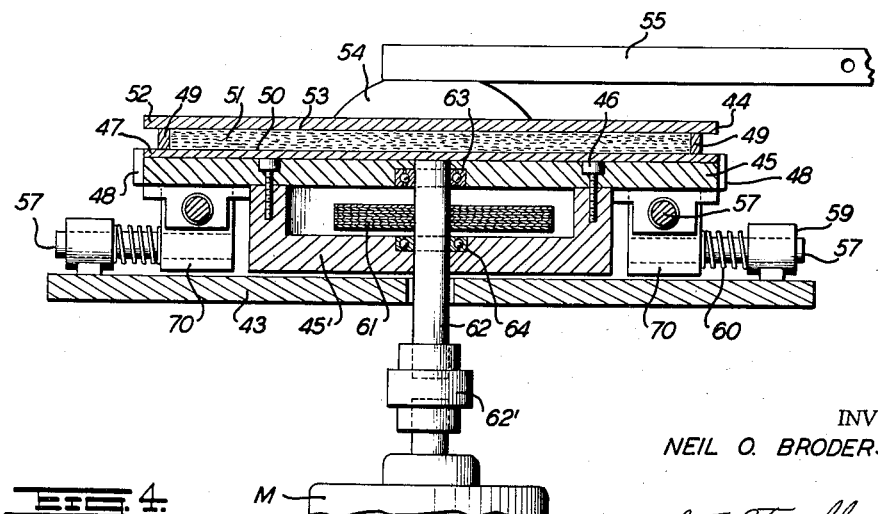
FIG. 4 is a vertical sectional view of another form of apparatus suitable for practicing the invention, with parts shown in elevation.

Referring to FIGS. 4 and 5, 43 generally designates a support for the mold 44. The support 43 includes a platform portion 45 having a substantially flat horizontal upper surface 46. The support 43 also includes the mold vibrating elements to be more fully described hereinafter. The mold 44 comprises a lower portion 47 mounted for movement in a plane generally parallel to the plane of the surface 46 of support member 45. In the illustrated form of the invention mold portion 47 is placed on the platform 45 and held firmly in place by bracket elements 48.

The upper surface of the mold portion 47 has secured thereto peripheral wall portions 49, which cooperate with the upper surface 50 of the lower mold element 47 to define a mold cavity generally designated 51, adapted to receive a sticky liquid polymerizable plastic composition having incorporated therein lamellae of the light-reflecting type.

The mold 44 also includes an extended flat surfaced cover member 52 having a dimension at least as great as the area defined by the outer walls of the peripheral wall structures 49. Whereby when the upper or cover portion 52 of the mold 44 is in place, undersurface 53 contacts the wall structure 49 and the upper surface of the mass of polymerizable material contained in the mold.

The upper member of the mold portion 52 is held in a substantially fixed position by fastening weighted suction cups 54 mounted on pivoted arms 55 which are rigidly fastened to the base of the machine table.

The lower mold element 47 and its supporting platform 45 are mounted for floating horizontal movement by means of the brackets 59 and the bearing members 70 with the latter slidably mounted on the two pairs of spaced tie rods 57. Coil springs 60 mounted on each end of each tie rod 57 serve to yieldably constrain the movements of the structure along the tie rods 57.

The actuating mechanism is comprised of a set of unbalanced weights 61 securely fixed to a rotatable shaft 62 which is mounted in bearing members 63 and 64 secured to the platform 45 and a depending casting 45'. The shaft 62 is connected by a flexible coupling 62' to an electric motor M which is securely mounted on a support, not shown.

A wide variety of amplitudes and frequencies are obtainable by varying the speed of the motor, the degree of unbalance of the rotating weights 61 and the stiffness of the spring members 60.

In operation of this form of the invention, a relatively sticky liquid polymerizable plastic material provided with suitable catalyst and accelerators and containing light-reflecting lamellae is poured into the cavity defined by the upper surface 50 of the mold element 47 and the inner edges of the wall members 49. The thickness of the plastic mass 51 is determined by the height of wall elements 49 and for the purpose of illustration said wall members have a height of about ⅛ inch. The cover member 52 is then placed on top of the lower mold portion as illustrated in FIG. 4 with the under surface 53 in adhesive contact with the upper surfaces of wall elements 49.

The actuating mechanism is energized, causing the lower mold portion to move at high frequencies and relatively low amplitudes. The high frequency, low amplitude oscillatory motion subjects the soft plastic mass, as the under surface 53 of the cover 52 is dragged by the plastic, to an oscillating motion to effectively orient the lamellae contained in the plastic in planes substantially parallel to the cover 52 producing an extremely brilliant sheen in the plastic composition. As the liquid plastic composition polymerizes, the resistance to movement of the plastic composition increases until the plastic composition has gelled, set or cured to a point where the lamellae are securely locked in their oriented positions.

It has been found that good, reproducible results are obtained in producing plastic sheets about ⅛ inch thick with the form of the invention shown in FIGS. 4–5 when the speed of the motor is about 3,000 revolutions per second and the amplitude of rotation of the bottom mold portion is about .02 inch. Where a sheet to be produced has a thickness of about ¼ inch, it has been found that the amplitude of rotation of about 0.15 inch at a rotating speed on the shaft of about 3,000 revolutions per minute produces very satisfactory results.

With the forms of the invention shown in FIGS. 1–3 very good reproducible results have been obtained at amplitudes of from ⅛ inch to about 1 inch at a frequency of about 5 to about 200 cycles per minute.

As hereinbefore described, there are numerous plastic compositions, including different formulations of polyester resins, which with added catalysts and accelerators and elevated temperatures pass through a gel state before becoming hard and rigid. The commercially available polyester resins are well suited for use with the present invention. For example, the reaction product of various dibasic acids, both saturated and unsaturated, with various glycols dissolved in 20 to 50 percent of a polymerizable monomer selected from the group styrene, vinyltoluene, diallyl phthalate, methyl methacrylate give very satisfactory results.

Peroxide catalysts such as benzoyl peroxide, methyl ethyl ketone peroxide, cumene hydroperoxide, and t-butyl perbenzoate may be employed with such polyester resins as is well known in the art, as well as various accelerators and promoters which generally fall into the groups of amines, mercaptans, metallic oxides, metal naphthenates, etc.

In general, the choice of catalysts, accelerators, and/or promoters, and the quantities of these agents are determined so that after mixing with the resins and pigments, the resin will not increase substantially in viscosity and undergo gelation before the mixture can be transferred to the mold or before contact with the free surface of the plastic composition by a portion of the mold is brought about. Oscillatory motion of the plastic mass for orienting the lamellae must begin before or in the very early stages of gelation while the mass is still fluid.

As hereinbefore disclosed the type of pigments required to provide nacreous products fall into two types, organic and inorganic. The quantity of light-reflecting lamellar pigments employed depends on the degree of luster and optical density desired in the finished product. With guanine crystals derived from fish as little as 0.1% to about 0.4% by weight will give useful product while if inorganic lamellar pigments such as lead acid arsenate, lead acid phosphate, basic lead carbonate are employed from about 0.25% to upwards of 3.0% may be used.

In addition to the polyester resins, other polymerizable plastic compositions may be readily employed in the practice of the present invention, such as, vinyl compounds, styrenes, acrylics, and epoxy resins.

In the practice of the present invention, it is preferable to start with the polymerizable liquid organic compound as a viscous syrup. The use of syrups has been found to reduce any tendency of the light-reflecting lamellae to settle out under the influence of gravity. The term "polymerizable liquid" as employed in the claims is intended to include flowable compositions of varied viscosities.

This application is a continuation-in-part of my application Serial No. 549,948 filed November 30, 1955, and now abandoned for "Method and Apparatus for Forming Articles of Plastic."

I claim:

1. Apparatus for forming articles of polymerizable plastic composition comprising a mold portion adapted to hold a mass of tacky polymerizable plastic composition in liquid form with a surface thereof exposed, a movable member having an extended plane surface adapted to overlie the mold and adhesively engage the exposed surface of the mass, means for subjecting the mass of plastic to indurating conditions, and means for moving the member relatively to the mold portion to produce movement of the plastic mass, said means including torque limiting means whereby the movement of the member is terminated when the viscosity of the mass reaches a predetermined stage.

2. Apparatus for forming articles of polymerizable plastic composition comprising a mold portion adapted to hold a quantity of polymerizable plastic composition in liquid form, said mold portion having at least one exposed surface, a member adapted to overlie the mold and contact the mass of plastic material through said exposed surface, means for subjecting the mass of plastic material to indurating conditions and means for causing relative movement between the plastic mass and the member including torque limiting means whereby the relative movement between the plastic mass and the member is terminated when a predetermined frictional force is developed at the surface of contact between the overlying member and the plastic mass by the increasing viscosity of the plastic mass.

3. Apparatus for forming articles of polymerizable plastic composition comprising a mold portion adapted to hold a quantity of polymerizable plastic composition in liquid form, said mold portion having at least one exposed surface, a member adapted to overlie the mold and contact the mass of plastic material through said exposed surface, means for subjecting the mass of plastic material to indurating conditions and means for causing relative movement between the plastic mass and the member including clutch members adjusted to slip at a predetermined torque whereby the relative movement between the plastic mass and the member is terminated when a predetermined frictional force is developed at the surface of contact between the overlying member and the plastic mass by the increasing viscosity of the plastic mass.

4. Apparatus for forming articles of polymerizable plastic composition comprising a mold portion adapted to hold a quantity of polymerizable plastic composition in liquid form, said mold portion having at least one exposed surface, a member adapted to overlie the mold and contact the mass of plastic material through said exposed surface, means for subjecting the mass of plastic material to indurating conditions and means for causing relative movement between the mold and the member including resilient members providing a predetermined limit of torque transmission to the member.

5. A method of forming articles of polymerizable plastic composition which comprises forming a suspension of light-reflecting lamellae in a polymerizable plastic composition in sticky liquid form, introducing said suspension into a container to provide a mass thereof having a free surface and a depth of at least 0.05 inch, contacting the free surface of the sticky mass with a member having an extended plane surface substantially coextensive with said free surface, and causing relative oscillatory movement between said container and said member in a plane substantially parallel to said free surface to subject said mass to oscillatory motion in planes parallel to the plane of the extended surface of the member while causing at least partial induration of said plastic composition to orient the lamellae in substantially parallel relation to said free surface.

6. The method defined in claim 5 wherein the oscillatory movement between the container and said member is substantially rectilinear.

7. The method defined in claim 5 wherein the oscillatory movement between the container and said member has a rotary component.

References Cited in the file of this patent

UNITED STATES PATENTS

| | | |
|---|---|---|
| 2,289,713 | Land | July 14, 1942 |
| 2,372,177 | Conner | Mar. 27, 1945 |